(12) United States Patent
Schautt et al.

(10) Patent No.: US 6,986,411 B2
(45) Date of Patent: Jan. 17, 2006

(54) ELECTROMECHANICAL BRAKE WITH SELF-BOOSTING AND VARYING WEDGE ANGLE

(75) Inventors: Martin Schautt, München (DE); Antonio Pascucci, München (DE); Henry Hartmann, Seefeld (DE)

(73) Assignee: ESTOP GmbH, (DE)

( * ) Notice: Subject to any disclaimer, the term of this patent is extended or adjusted under 35 U.S.C. 154(b) by 0 days.

(21) Appl. No.: 10/718,325

(22) Filed: Nov. 20, 2003

(65) Prior Publication Data

US 2004/0104083 A1   Jun. 3, 2004

Related U.S. Application Data

(63) Continuation of application No. PCT/EP02/05432, filed on May 16, 2002.

(30) Foreign Application Priority Data

May 21, 2001 (DE) ................. 101 24 754
Nov. 5, 2001 (DE) ................. 101 54 178

(51) Int. Cl.
*F16D 55/08* (2006.01)
(52) U.S. Cl. ............... 188/72.7; 188/72.2; 188/343
(58) Field of Classification Search ........... 188/72.7, 188/72.2 X, 343 X, 72.1, 72.9, 74, 75
See application file for complete search history.

(56) References Cited

U.S. PATENT DOCUMENTS

| | | | | |
|---|---|---|---|---|
| 5,137,126 A | * | 8/1992 | Magnaval et al. | 188/343 |
| 6,305,506 B1 | * | 10/2001 | Shirai et al. | 188/72.2 |
| 6,318,513 B1 | * | 11/2001 | Dietrich et al. | 188/72.7 |

FOREIGN PATENT DOCUMENTS

| | | |
|---|---|---|
| DE | 19819564 | 12/1999 |
| DE | 19851668 | 5/2000 |
| DE | 19957939 | 5/2001 |
| WO | 98/14715 | 4/1998 |

* cited by examiner

*Primary Examiner*—Melanie Torres (57) ABSTRACT

An electromechanical brake has an electrical actuator which generates an actuation force and acts on at least one friction member in order to press said member to elicit a friction force against a rotational component, which is to be braked, of the brake. A self-boosting device is arranged between the friction member and the electrical actuator, said device serving to self-boost the actuation force generated by the electrical actuator, and having at least one wedge (12), which has a wedge surface (14) arranged at a wedge angle a and supported on a corresponding counter bearing (16). When the brake is actuated, the electrical actuator displaces the wedge (12) relative to the counter bearing (16) in an actuation direction (x) to press the friction component against the component, which is to be braked, of the brake. To achieve a high degree of self-boosting and short actuation paths, the wedge angle a is constant on a first segment (18) of the wedge surface (14), which is effective at the start of brake actuation, and is smaller on a second segment (20) which follows the first segment (18) than on the first segment (18).

15 Claims, 4 Drawing Sheets

ELECTROMECHANICAL BRAKE WITH SELF-BOOSTING AND VARYING WEDGE ANGLE

This application is a continuation of the "parent" PCT International Patent Application Number PCT/EP02/05432, entitled "Electromechanical Brake With Self-Boosting And Varying Wedge Angle," filed on May 16, 2002, which designates the United States, and which claims priority to German Application Number 101 24 754.0, filed on May 21, 2001, and German Application Number 101 54 178.3, filed on Nov. 5, 2001.

The invention relates to self-boosting electromechanical disc brakes, especially for motor vehicles. In the case of such disc brakes, an electrical actuator provides an actuation force, which puts the friction linings of the brake into contact with the rotating brake disc. A self-boosting device in the form of a wedge arrangement exploits the kinetic energy which is contained in the rotating brake disc for further engagement of the friction linings, i.e. the friction linings are pressed against the brake disc with a force which is significantly increased compared to the actuator force, and is not provided by the electrical actuator. The basic principle of such a brake is known from German Patent 198 19 564.

In known electromechanical brakes which use a wedge arrangement as the self-boosting device, the wedge angle is constant, i.e. the wedge surface(s) of the wedge arrangement have one and the same wedge angle along their extent. Because the coefficient of friction $\mu$ does not remain constant while the brake is operating, but varies strongly, for instance depending on temperature, in practice either the wedge angle a is chosen so that taking into account all variations of the coefficient of friction which occur during operation of the brake, the actuation force of the actuator always has a positive sign (pressed wedge principle), or the wedge angle a is chosen so that taking into account all possible variations of the coefficient of friction, the actuation force of the actuator always has a negative sign (pulled wedge principle).

Ideally, one would want to choose the wedge angle $\alpha$ so that for an optimum coefficient of friction the condition $\mu_{opt}=\tan \alpha$ is fulfilled, because then—after the initiation of a braking process by the actuator—the actuation force which the actuator must provide to achieve the desired braking or friction moment equals zero. However, even with such an "ideally" chosen wedge angle $\alpha$, in actual operation of the brake high actuation forces may be required, because, as already mentioned, the coefficient of friction varies strongly. Another criterion which should be taken into account in the design of the wedge arrangement is the displacement distance of the wedge, which is required to press the friction linings onto, for instance, the brake disc, and to achieve the desired friction force. This displacement distance should be as short as possible, to keep the construction of the brake compact. This requirement can only be fulfilled with a relatively large wedge angle, whereas for the previously mentioned aim of high self-boosting, a relatively small, i.e. flat wedge angle would be required.

The invention is based on the object of improving an electromechanical brake which uses a wedge arrangement as a self-boosting device, while retaining as compact a construction as possible, in such a way that even with extreme values of the coefficient of friction which occur in operation, only a small actuation force of the actuator is required to achieve the highest friction forces.

This object is achieved according to the invention by an electromechanical brake having the features defined in claim 1. According to the invention, the wedge surface of the wedge of the wedge arrangement, the essential components of which are the wedge and a counter bearing, are in such a form that the wedge angle $\alpha$, on a first segment of the wedge surface, which is effective at the start of a brake actuation, is constant, and on a second segment which follows the first segment, is smaller than on the first segment. Such a form fulfils, on the one hand, the requirement for a short actuation distance of the wedge ("actuation distance" here means the wedge displacement distance which is required to bring a friction lining into contact with the brake component which is to be braked, and to press on this component with a desired force), and on the other hand the requirement for high self-boosting when it is really needed, that is with high and highest required friction forces and unfavourable coefficients of friction.

The second segment of the wedge surface, which is arranged under a smaller (i.e. flatter) wedge angle than the first segment, can also have a constant wedge angle along its extent. However, the second segment can also consist of several subsegments, each of which has a constant wedge angle, the wedge angle becoming smaller, i.e. flatter, from subsegment to subsegment.

Preferably, the transition between the first segment and the second segment of the wedge surface is formed so that it has second-order continuity, which means mathematically that at the transition point the first derivative is constant. The transitions between individual subsegments, if any, of the second segment of the wedge surface are also in such a form that they have second-order continuity. In this way, when the transitions are crossed, there are no abrupt changes of the degree of self-boosting, and no resulting variations of the friction force, so that the controllability of the brake is improved.

According to another embodiment of the brake according to the invention, the wedge angle $\alpha$ along the second segment of the wedge surface reduces continuously (degressive wedge angle). To obtain a perfect transition between the first segment and second segment of the wedge surface, the second segment of the wedge surface has, at the transition point, a wedge angle $\alpha$ which is identical to the first segment.

In a preferred embodiment of the brake according to the invention, the wedge angle a along the second segment of the wedge surface is chosen so that with constant actuator force, i.e. constant actuation force, the pressure force which acts on the friction member increases as the wedge is increasingly displaced in the actuation direction. For completeness, it is to be mentioned here that this observation applies only to an idealised, friction-free state. In practice, when the wedge is displaced, a break-away force must first be overcome, which requires a certain short-term increase of force. However, in the new stationary state which is achieved after a (further) displacement, the statement that in spite of the higher pressure force which is achieved in the new position of the wedge no higher actuator force must be applied is true again.

In a particularly preferred embodiment, the wedge angle a along the second segment is chosen so that when the pressure force is increased by a further displacement of the wedge in the actuation direction, even with $\mu=\mu_{min}$, the required actuator force does not increase. Such a design ensures that a given actuator force, e.g. the maximum actuation force which the actuator can generate, is enough in all circumstances to achieve the highest possible friction forces in a braking process if required.

According to another embodiment, the wedge angle $\alpha$ along the second segment of the wedge surface is chosen so that as the actuator force decreases, the pressure force which acts on the friction member increases as the wedge is displaced increasingly in the actuation direction. Such a design makes it possible to achieve high and highest friction forces with relatively small actuator force, so that the actuator can be relatively weak in power and thus small.

Below, some considerations are explained and illustrated using the attached figures, which are helpful in determining an optimum wedge angle course of a brake according to the invention. In the figures.

It is a basic principle that the maximum required friction or braking moment, also called the nominal friction moment, and the normal force which is required for it with a minimum coefficient of friction are defined for a given brake because of their design. The term "normal force" here means the force which acts in a direction which is normal to the brake component to be braked, and which presses the friction member onto the component to be braked.

In the considerations below, it is assumed that the brake is prevented from exceeding the nominal friction moment by a control. For the power of the brake, such a limit on the friction moment is not a disadvantage, because the nominal friction moment will in any case be chosen, e.g. in the case of a vehicle brake, so that the vehicle wheel to be braked can still be brought to locking with the nominal friction moment, even with optimum tyre adhesion. Similarly, e.g. in the case of a shaft brake, the nominal friction moment will be chosen so that the shaft does not shear off on braking. A friction moment beyond the nominal friction moment which is chosen by intelligent design would therefore bring no benefit, or may even cause damage.

From the maximum required friction moment, the maximum required friction force, to generate which a normal force must be provided, is derived. Its magnitude depends on the prevailing coefficient of friction. The maximum normal force to be provided to achieve the maximum required friction force is therefore a function of the coefficient of friction $\mu$, according to the relationship $$F_{N,max} = f(\mu)\big|_{F_{R,max}} = \frac{F_{R,max}}{\mu} \qquad (1)$$

where $F_{N,max}$=maximum required normal force (to achieve maximum required friction force)

$F_{R,max}$=maximum required friction force $\mu$=coefficient of friction

From the above relationship, it follows that the highest normal force is required if the coefficient of friction is minimal, i.e. if $\mu=\mu_{min}$.

Figure 1:
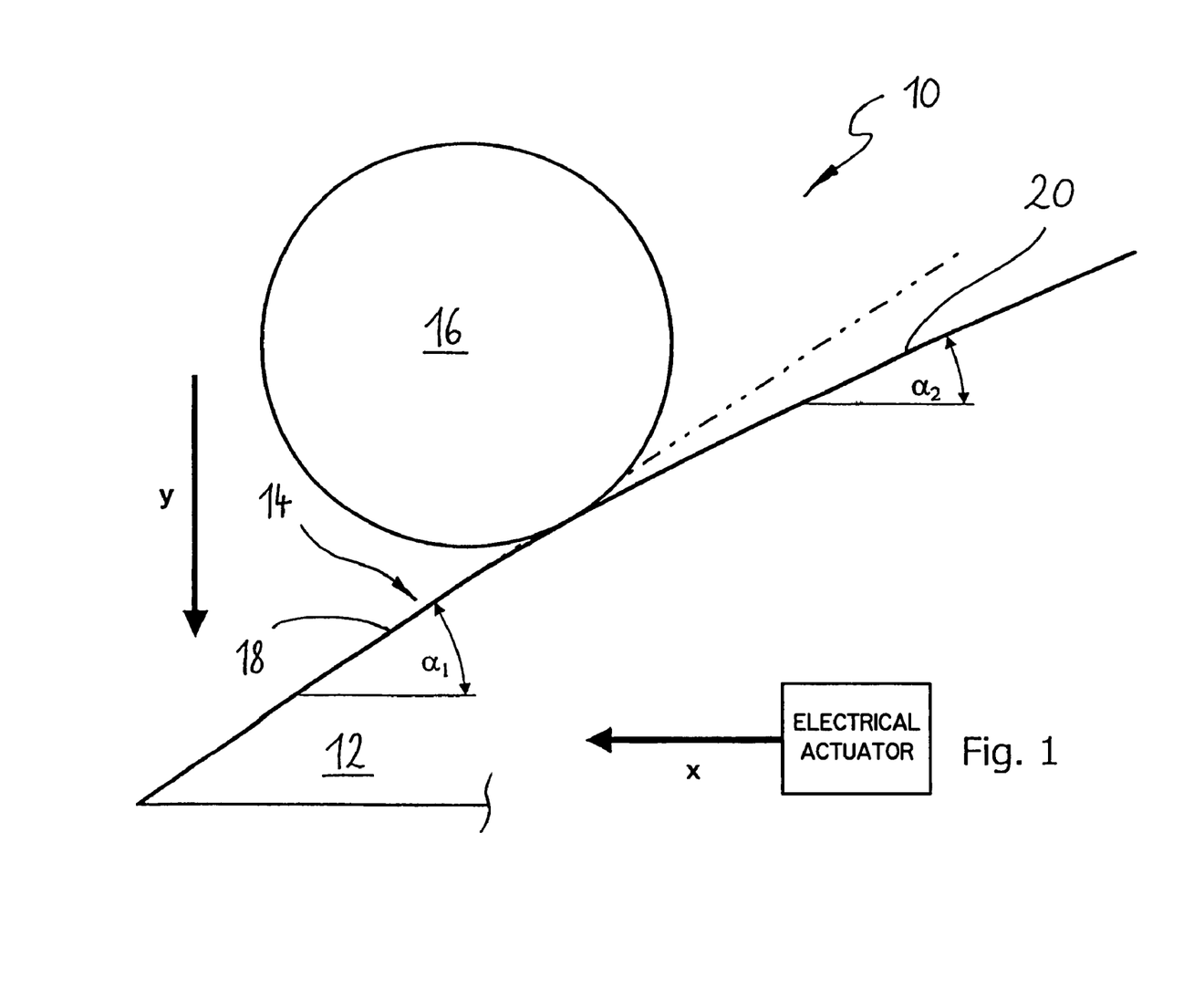
FIG. 1 shows schematically a wedge arrangement as it can be used in a brake according to the invention.

Assuming that the brake being considered is a disc brake with a brake caliper which straddles the brake disc, the brake caliper expands during the braking process in proportion to the normal force. The displacement distance of the wedge 12 in the direction of rotation of the brake disc to be braked is likewise proportional to the expansion of the brake caliper. Taking account of the above-mentioned relationship and a maximum occurring normal force which is limited by the design of the brake, the following statements can be made:

The position, resulting at maximum braking force, of the wedge 12 in the direction of rotation of the brake disc to be braked is proportional to the prevailing coefficient of friction $\mu$.

The position, which is displaced furthest in the actuation direction x, of the wedge is reached only when the coefficient of friction $\mu$ takes its minimum value.

The actuation force of the actuator reaches its maximum value in the direction of rotation with minimum coefficient of friction.

For the case of maximum braking force requirement with simultaneous minimum coefficient of friction, a reduction of the wedge angle $\alpha$ is permitted with respect to those areas of the wedge surface 14 which are then effective, i.e. in the case of a correspondingly large displacement of the wedge in the actuation direction x, because such large wedge displacements are not reached in any other operating state.

An optimum wedge angle course depending on the normal force is now sought. The optimum wedge angle course should guarantee an even tension and pressure distribution of the available actuator force over the whole operating range of the brake, and ensure that the brake, particularly in pulled wedge operation, does not lock, which can happen if the coefficient of friction is much greater than the tangent of the wedge angle $\alpha$ and the actuator can no longer provide enough tensile force to prevent a further displacement of the wedge 12 in the actuation direction. Additionally, the actuation force of the actuator must be great enough to be able to release the brake again in all operating conditions.

The result of the above considerations is that very large wedge displacements occur only with very small coefficients of friction. In the range of small wedge displacements, the full breadth of variation of the coefficient of friction occurs, for which reason the wedge angle a must be chosen to be constant in the first segment 18 of the wedge surface 14. The end of the first segment 18 of the wedge surface 14 is defined by the value of the normal force with which, assuming a maximum coefficient of friction, the maximum friction force belonging to the maximum braking moment is achieved. For a sliding-caliper disc brake, therefore, the desired value of the normal force is given by the relationship $$F_{N,1,\max} = \frac{F_{R,\max}}{2\mu_{\max}} \qquad (2)$$

where $F_{N,1,max}$=maximum normal force in first segment of wedge surface $F_{R,max}$=maximum friction force $\mu_{max}$=maximum coefficient of friction On the basis of the considerations explained above, for the normal force $F_{N,1,max}$ there is a uniquely defined wedge position and thus an associated actuation distance $X_1$, i.e. the first segment 18 of the wedge surface 14, over which the wedge angle a is constant, begins with a zero wedge displacement and ends at a point corresponding to wedge displacement $X_1$.

For wedge displacements in the range $0<x<X_1$, i.e. for the first wedge segment, the optimum wedge angle a is now sought. In this case, allowing for an additional safety factor Z for pulled wedge operation, the actuator forces for the case of the maximum coefficient of friction (for pulled wedge operation) and the case of the minimum coefficient of friction (for pressed wedge operation) are equal and opposite. The following should therefore be true:

$$F_{A,1,press,\max} = -\frac{F_{A,1,tens,\max}}{Z_{pulledwedge}} \qquad (3)$$

where $F_{A,1,press,max}$=maximum compressive force to be provided by actuator $F_{A,1,tens,max}$=maximum tensile force to be provided by actuator Z=safety factor for pulled wedge operation For the actuator force $F_A$, the following also applies:

$$F_A=(\tan \alpha-\mu)F_N, \qquad (4)$$

so that equation (3) above can be rewritten as $$(\tan \alpha-\mu_{min})F_N \cdot Z_{pressedwedge}=-(\tan \alpha-\mu_{max})F_N \qquad (5)$$

so that the optimum wedge angle $\alpha_1$ for the first segment is $$\tan \alpha_1 = \frac{\mu_{\max} + Z \cdot \mu_{\min}}{1+Z} \qquad (6)$$

With the maximum coefficient of friction $\mu_{max}$ and a wedge displacement $X_1$, the required maximum friction force $F_{R,max}$ occurs. However, with the minimum coefficient of friction $\mu_{min}$, a substantially smaller braking force results from this wedge position, according to the relationship $$F_{R,1,\mu\min} = \frac{\mu_{\min}}{\mu_{\max}} \cdot F_{R,\max} \qquad (7)$$

The required actuator force is given by the relationship $$F_{A,1,press,\max} = \frac{\tan \alpha_1 - \mu_{\min}}{\mu_{\min}} \cdot \frac{F_{R,1,\mu\min}}{2} \qquad (8)$$

which can be rewritten, using relationships (3) and (6), as $$F_{A,1,press,\max} = \frac{\mu_{\max} - \mu_{\min}}{(Z+1) \cdot \mu_{\max}} \cdot \frac{F_{R,\max}}{2} \qquad (9)$$

The first segment 18 of the wedge surface 14 is thus uniquely determined with respect to all substantial design magnitudes.

The second segment 20 of the wedge surface 14 has in general a smaller, i.e. flatter, wedge angle than the first segment 18. In the choice of the wedge angle $\alpha$ for the second segment 20 of the wedge surface 14, it should be noted that a large wedge angle reduces the actuation distance, which has a favourable effect on the construction volume of the brake and the dynamics of the adjustment processes. Additionally, the chosen wedge angle course should result in the smallest possible change to the wedge angle, so that the self-boosting factor changes as little as possible depending on the wedge displacement, which is advantageous for stable and therefore fault-free control.

A very advantageous wedge angle course for the second segment 20 of the wedge surface 14 is obtained if the wedge angle $\alpha$ is reduced along the second segment only until the maximum actuator force $F_{A,1,press,max}$, which is defined in equation (9) for the first segment 18 of the wedge surface 14, is enough to displace the wedge in all operating conditions, in particular if $\mu=\mu_{min}$.

To determine this advantageous wedge angle course for the second segment 20 of the wedge surface 14, therefore, the case of $\mu=\mu_{min}$ is considered, so that the maximum required friction force can be provided even for this extreme case, and the boundary condition $$F_A=F_A(\mu=\mu_{min}; \alpha_x=f(F_{N,x}))=F_{A,1,press,max}=\text{const.} \qquad (10)$$

is defined for the actuator force $F_A$. This boundary condition ensures that the actuator force does not exceed the value which was determined as the maximum value for the first segment 18 of the wedge surface 14. Otherwise expressed, the boundary condition (10) means that for every position $x>X_1$ the actuator force $F_A$ for $\mu=\mu_{min}$ takes its maximum value. For operating conditions in which $\mu>\mu_{min}$, the actuator force FA becomes less, and may even become negative (pulled wedge operation). In equation (10), if the actuator force $F_A$ is replaced according to the relationship (4) and the relationship (2) is inserted for the normal force $F_N$, the result for the sought course of tan $\alpha_{2,x}$ is $$(\tan \alpha_1-\mu_{min})F_{N,1,max}=-(\tan \alpha_{2,x}-\mu_{min})F_{N,x} \qquad (11)$$

which can be rewritten as $$\tan\alpha_{2,x} = \mu_{\min} + (\tan\alpha_1 - \mu_{\min})\frac{F_{N,1,\max}}{F_{N,x}} \quad (12)$$

and then as $$\tan\alpha_{2,x} = \mu_{\min} + (\tan\alpha_1 - \mu_{\min})\frac{F_{R,\max}}{2\cdot\mu_{\max}}\cdot\frac{1}{F_{N,x}} \quad (13)$$

which represents a differential equation for the wedge course.

Figure 2:
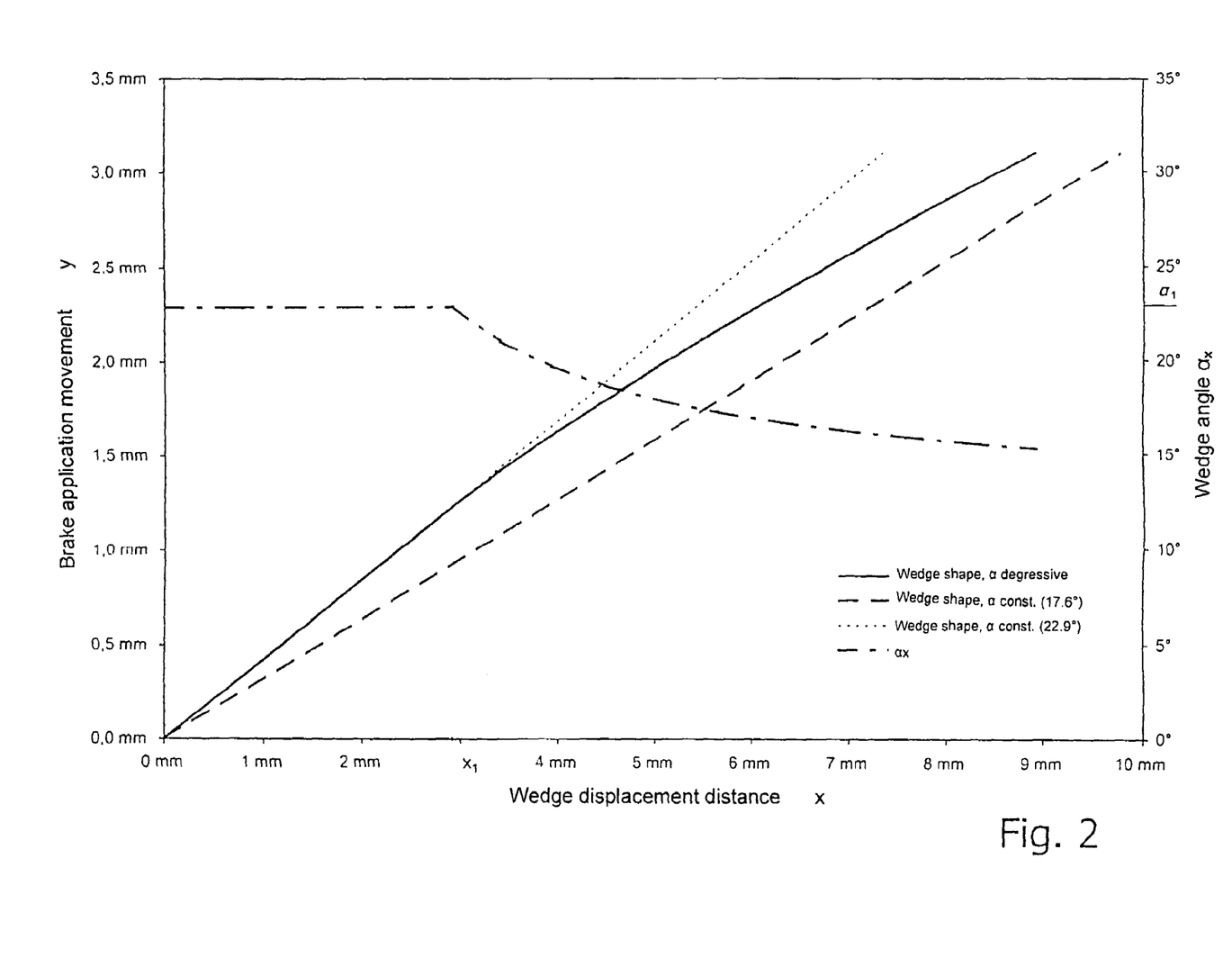
FIG. 2 shows graphs which clarify a wedge angle course according to the invention.
Figure 3:
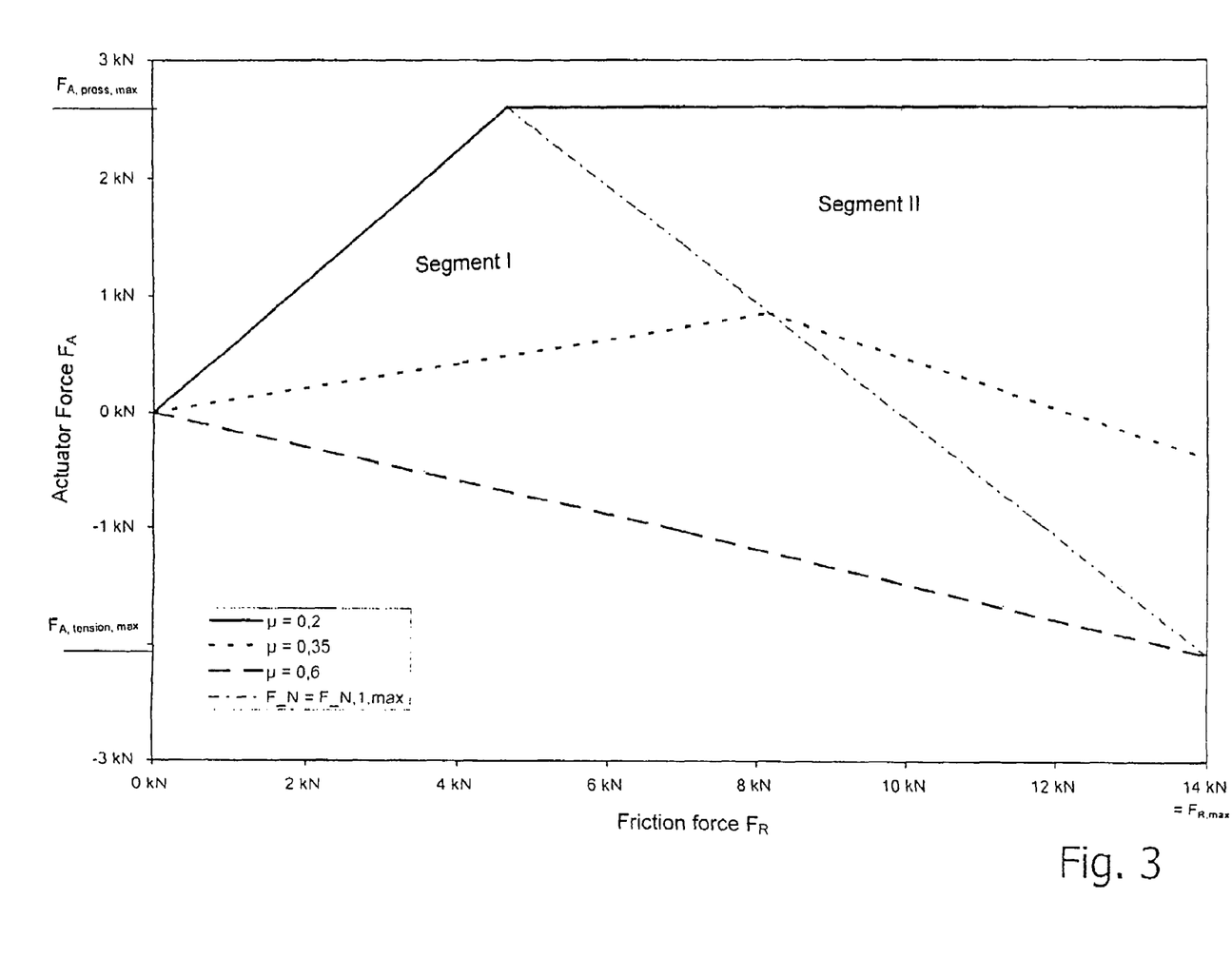
FIG. 3 shows a diagram in which the actuator force $F_A$ is plotted over the friction force $F_R$ for different coefficients of friction $\mu$.
Figure 4:
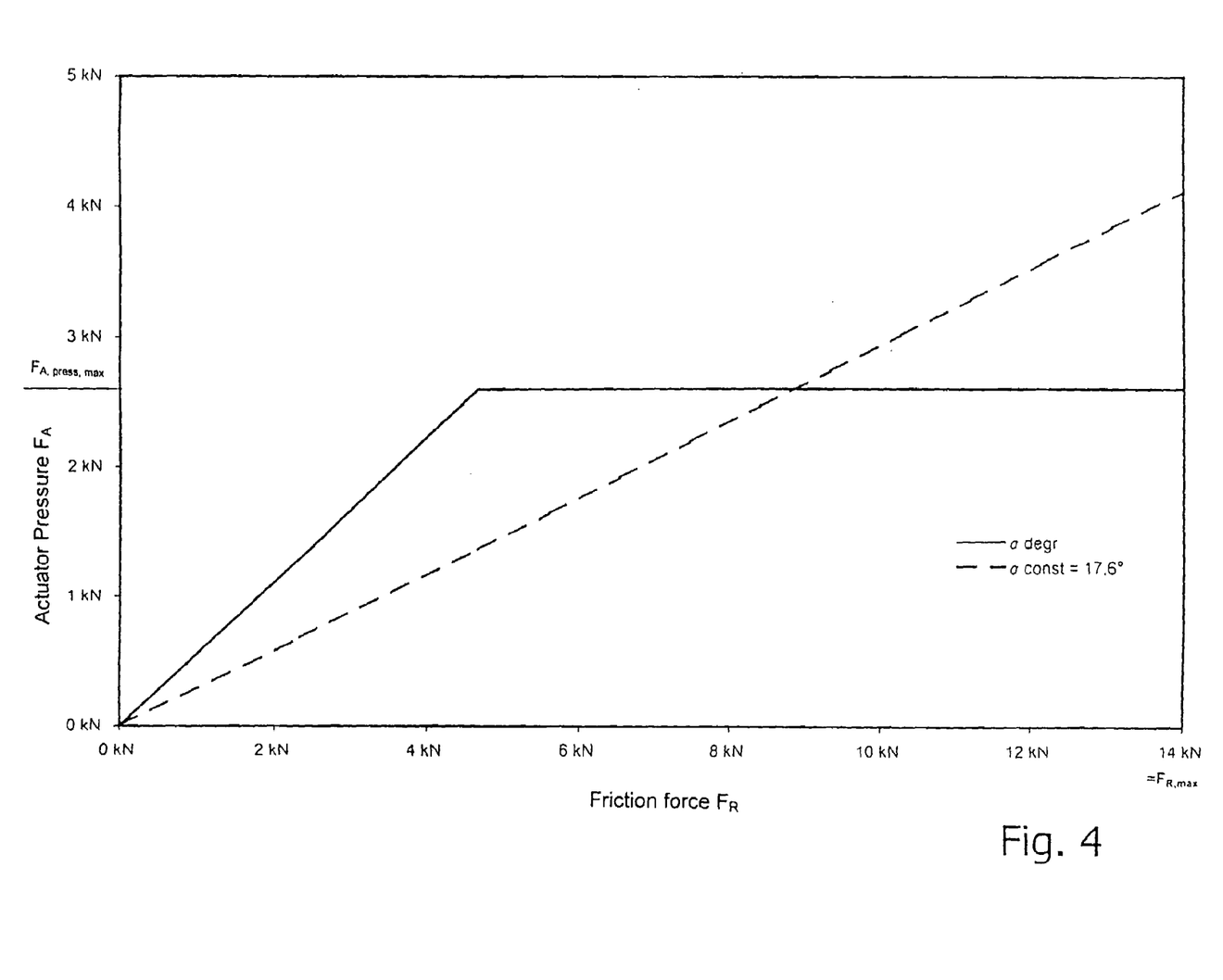
FIG. 4 shows another diagram, in which the actuator force $F_A$ is plotted over the friction force $F_R$ and in which a comparison of the force course of a wedge arrangement with degressive wedge angle $\alpha$ for braking with minimum coefficient of friction $\mu_{min}$ is reproduced, and In FIG. 1, a wedge arrangement 10 is shown very schematically and only in part, as it can be used in a brake according to this invention. The wedge arrangement 10 includes, as its most important components, a wedge 12 with a wedge surface 14 which is arranged at a wedge angle $\alpha$. The wedge 12 can be displaced by an electrical actuator (not shown here) along an actuation direction x, to move a friction lining (also not shown here) of the electromechanical brake in a direction y towards a brake component to be braked. The brake component to be braked, in the case of a disc brake, is the rotating brake disc. When the wedge 12 is displaced in the actuation direction x, the wedge surface 14 of the wedge 12 is supported on a counter bearing 16, the position of which is fixed in relation to the wedge. So that the wedge arrangement, on the one hand, has a high degree of self-boosting, and on the other hand, makes short actuation distances possible, the wedge surface 14 is divided into a first segment 18 and a subsequent second segment 20. The first segment 18 is effective at the start of a brake actuation, and has a constant wedge angle $\alpha_1$ over its whole extent. The second segment 20 of the wedge surface 14 has a degressive wedge angle course, i.e. the wedge angle $\alpha_2$ of the second segment 20 is reduced continuously compared to the wedge angle $\alpha_1$ of the first segment 18. The dotted-dashed line in FIG. 1 represents the continuation of the constant wedge angle $\alpha_1$, so that the increasing deviation of wedge angle $\alpha_2$ and wedge angle $\alpha_1$ can easily be detected.

In FIGS. 2 to 4, the effects of a wedge angle course which is formed in conformity with this invention are clarified using diagrams. The graphs which are included in the diagrams were computed on the basis of representative values, that is for $\mu_{\min}=0.2$, $\mu_{\max}=0.6$, $Z=0.8$, an assumed maximum required friction force $F_{R,\max}=14$ kN, and an assumed maximum brake application distance $y_{\max}=3.1$ mm.

In FIG. 2, the continuous line shows the wedge contour which results from a simple numerical integration of the differential equation (13). For comparison, the dotted line continues the constant wedge angle of 22.9° which was calculated for the first wedge segment, whereas the dashed line reproduces a constant wedge angle of 17.6°, which would result if a contour which fulfils condition (3), with a constant wedge angle throughout both wedge segments, was used. The dotted-dashed line, to which the right-hand ordinate of FIG. 2 applies, indicates the course of the wedge angle a as a function of the wedge displacement.

If, using $$\mu_x = \frac{F_{R,\max}}{2\cdot F_{N,x}} \quad (14)$$

an auxiliary magnitude $\mu_x$ is introduced, corresponding to the maximum coefficient of friction, which in turn corresponds to a specified wedge position, equation (13) is represented somewhat more clearly as $$\tan\alpha_x = \mu_{\min} + (\tan\alpha_1 - \mu_{\min})\frac{F_{R,\max}}{2\cdot\mu_{\max}}\cdot\frac{2\cdot\mu_x}{F_{R,\max}} \quad (15)$$

and rewritten as $$\tan\alpha_x = \mu_{\min} + (\tan\alpha_1 - \mu_{\min})\frac{\mu_x}{\mu_{\max}} \quad (16)$$

In this way the second segment 20 of the wedge surface 14 is also uniquely described with respect to the wedge angle course.

FIG. 3 shows that with the chosen design, irrespective of the prevailing coefficient of friction $\mu$, a maximum actuator force $F_A$ of 2.6 kN in the compression direction (with $\mu=\mu_{\min}$, see the continuous line) and 2.1 kN in the tension direction (with $\mu=0.6$, see the dashed line) to achieve the maximum required friction force $F_{R,\max}=14$ kN is not exceeded. The dotted line indicates the course of the actuator force for a mean coefficient of friction $\mu=0.35$. It can be seen that with such a mean coefficient of friction, for increasing friction forces the actuator force rises to the end of the first segment 18 of the wedge surface 14, and then falls in the second segment 20 for further increasing friction forces. In the range of very high friction forces, a change of sign of the actuator force even occurs, i.e. in these ranges the wedge 12 no longer works as a pressed wedge, but as a pulled wedge.

If the maximum actuator force $F_A=2.6$ kN assumed here and the maximum friction force $F_{R,\max}=14$ kN which is achieved with this actuator force are compared with an actuator force as would be required with a traditional constant wedge angle a over the whole wedge surface to achieve the same friction force $F_{R,\max}=14$ kN, the result for the degressive wedge angle course is an additional force boost according to the relationship $$C^*_{\alpha degr} = \frac{F_{A\max,\alpha const}}{F_{A\max,\alpha degr}} = \frac{\frac{\mu_{\max}-\mu_{\min}}{Z\cdot\mu_{\max}+\mu_{\min}}\cdot\frac{F_{F nom}}{2}}{\frac{\mu_{\max}-\mu_{\min}}{(Z+1)\cdot\mu_{\max}}\cdot\frac{F_{F nom}}{2}} = \frac{Z\cdot\mu_{\max}+\mu_{\max}}{Z\cdot\mu_{\max}+\mu_{\min}} \quad (17)$$

For the representative values which were assumed above, the result for a degressive wedge angle course compared with a constant wedge angle is a force boost value C* of 1.6. The stated relationship is reproduced graphically in FIG. 4, where the actuator force $F_A$ is shown against the friction force $F_R$. The continuous line gives the relationship for a degressive wedge angle course, whereas the dashed line corresponds to a constant wedge angle α, in each case for braking with minimum coefficient of friction. It can be seen that with a constant wedge angle α, to achieve the maximum friction force $F_{R,\max}$ an actuator force $F_A$ of about 4.1 kN would be required.

From a design point of view, therefore, the degressive wedge angle course is therefore very advantageous, because it makes it possible to design the actuator with less power, and therefore smaller, lighter and more economical, without affecting the braking power.

A look at FIG. 2 also shows that to achieve a desired brake application distance y with the degressive wedge angle course, shorter wedge displacement distances X are sufficient than would be required if a contour fulfilling the condition (3) was used with a constant wedge angle throughout.

The invention claimed is:

1. Electromechanical brake, especially for vehicles, with an electrical actuator which generates an actuation force and acts on one friction member in order to press said member to elicit a friction force against a rotational component, which is to be braked, of the brake, and a self-boosting device arranged between the friction member and the electrical actuator, said device serving to self-boost the actuation force generated by the electrical actuator, and having at least one wedge (12), which has a wedge surface (14) arranged at a wedge angle (α) and supported on a corresponding counter bearing (16), wherein the electrical actuator displaces the wedge (12) relative to the counter bearing (16) in an actuation direction (x) to actuate the brake, and the wedge angle (α) is constant on a first segment (18) of the wedge surface (14), which is effective at the start of brake actuation, and greater self-boosting is provided by a second segment (20) which follows the first segment (18), the wedge angle (α) on the second segment being smaller than on the first segment (18).

2. Brake according to claim 1, characterized in that in the wedge angle (α) on the second segment (20) is at least partly constant.

3. Brake according to claim 2, characterized in that the transitions between the first segment (18) and the second segment (20) and between parts of the second segment (20) have second-order continuity.

4. Brake according to claim 1, characterized in that the wedge angle ($\alpha$) along the second segment (20) reduces continuously, beginning with the value which the wedge angle ($\alpha$) has on the first segment (18) of the wedge surface (14).

5. Brake according to claim 1, characterized in that the wedge angle ($\alpha$) along the second segment (20) is chosen so that, with constant actuator force, the compressive force which acts on the friction member increases as the wedge (12) is increasingly displaced in the actuation direction (x).

6. Brake according to claim 5, characterized in that the wedge angle ($\alpha$) along the second segment (20) is chosen so that, with constant actuator force and minimum coefficient of friction, the compressive force which acts on the friction member increases as the wedge (12) is increasingly displaced in the actuation direction (x).

7. Brake according to claim 1, characterized in that the wedge angle ($\alpha$) along the second segment (20) is chosen so that, with reducing actuator force, the compressive force which acts on the friction member increases as the wedge (12) is increasingly displaced in the actuation direction (x).

8. Brake according to claim 2, characterized in that the wedge angle ($\alpha$) of the first segment (18) of the wedge surface (14) is determined by the relationship $$\tan\alpha_1 = \frac{\mu_{max} + Z \cdot \mu_{min}}{1 + Z}$$

where
  $\alpha_1$=wedge angle of first segment of wedge surface
  $\mu_{max}$=maximum coefficient of friction
  $\mu_{min}$=minimum coefficient of friction
  Z=safety factor.

9. Brake according to claim 3, characterized in that the wedge angle ($\alpha$) of the first segment (18) of the wedge surface (14) is determined by the relationship $$\tan\alpha_1 = \frac{\mu_{max} + Z \cdot \mu_{min}}{1 + Z}$$

where
  $\alpha_1$=wedge angle of first segment of wedge surface
  $\mu_{max}$=maximum coefficient of friction
  $\mu_{min}$=minimum coefficient of friction
  Z=safety factor.

10. Brake according to claim 4, characterized in that the wedge angle ($\alpha$) of the first segment (18) of the wedge surface (14) is determined by the relationship $$\tan\alpha_1 = \frac{\mu_{max} + Z \cdot \mu_{min}}{1 + Z}$$

where
  $\alpha_1$=wedge angle of first segment of wedge surface
  $\mu_{max}$=maximum coefficient of friction
  $\mu_{min}$=minimum coefficient of friction
  Z=safety factor.

11. Brake according to claim 5, characterized in that the wedge angle ($\alpha$) of the first segment (18) of the wedge surface (14) is determined by the relationship $$\tan\alpha_1 = \frac{\mu_{max} + Z \cdot \mu_{min}}{1 + Z}$$

where
  $\alpha_1$=wedge angle of first segment of wedge surface
  $\mu_{max}$=maximum coefficient of friction
  $\mu_{min}$=minimum coefficient of friction
  Z=safety factor.

12. Brake according to claim 6, characterized in that the wedge angle ($\alpha$) of the first segment (18) of the wedge surface (14) is determined by the relationship $$\tan\alpha_1 = \frac{\mu_{max} + Z \cdot \mu_{min}}{1 + Z}$$

where
  $\alpha_1$=wedge angle of first segment of wedge surface
  $\mu_{max}$=maximum coefficient of friction
  $\mu_{min}$=minimum coefficient of friction
  Z=safety factor.

13. Brake according to claim 7, characterized in that the wedge angle ($\alpha$) of the first segment (18) of the wedge surface (14) is determined by the relationship $$\tan\alpha_1 = \frac{\mu_{max} + Z \cdot \mu_{min}}{1 + Z}$$

where
  $\alpha_1$=wedge angle of first segment of wedge surface
  $\mu_{max}$=maximum coefficient of friction
  $\mu_{min}$=minimum coefficient of friction
  Z=safety factor.

14. Electromechanical brake, especially for vehicles, with an electrical actuator which generates an actuation force and acts on one friction member in order to press said member to elicit a friction force against a rotational component, which is to be braked, of the brake, and a self-boosting device arranged between the friction member and the electrical actuator, said device serving to self-boost the actuation force generated by the electrical actuator, and having at least one wedge (12), which has a wedge surface (14) arranged at a wedge angle ($\alpha$) and supported on a corresponding counter bearing (16), wherein
  the electrical actuator displaces the wedge (12) relative to the counter bearing (16) in an actuation direction (x) to actuate the brake, and
  the wedge angle ($\alpha$) is constant on a first segment (18) of the wedge surface (14), which is effective at the start of brake actuation, and is, on a second segment (20) which follows the first segment (18), smaller than on the first segment (18); characterized in that the wedge angle ($\alpha$) of the first segment (18) of the wedge surface (14) is determined by the relationship $$\tan\alpha_1 = \frac{\mu_{max} + Z \cdot \mu_{min}}{1 + Z}$$

where
$\alpha_1$=wedge angle of first segment of wedge surface
$\mu_{max}$=maximum coefficient of friction
$\mu_{min}$=minimum coefficient of friction
Z=safety factor.

15. Electromechanical brake, especially for vehicles, with an electrical actuator which generates an actuation force and acts on one motion member in order to press said member to elicit a friction force against a rotational component, which is to be braked, of the brake, and a self-boosting device arranged between the friction member and the electrical actuator, said device serving to self-boost the actuation force generated by the electrical actuator, and having at least one wedge (12), which has a wedge surface (14) arranged at a wedge angle ($\alpha$) and supported on a corresponding counter bearing (16), wherein
the electrical actuator displaces the wedge (12) relative to the counter bearing (16) in an actuation direction (x) to actuate the brake, and
the wedge angle ($\alpha$) is constant on a first segment (18) of the wedge surface (14), which is effective at the start of brake actuation, and is, on a second segment (20) which follows the first segment (18), smaller than on the first segment (18); characterized in that the wedge angle ($\alpha$) along the second segment (20) of the wedge surface (14) is determined by the relationship $$\tan\alpha_{2,x} = \mu_{min} + (\tan\alpha_1 - \mu_{min})\frac{\mu_x}{\mu_{max}}$$

where
$\alpha_{2,x}$=wedge angle of second segment of wedge surface as function of actuation distance x
$\alpha_1$=wedge angle of first segment of wedge surface
$\mu_x$=maximum coefficient of friction as function of actuation distance x
$\mu_{max}$=maximum coefficient of friction
$\mu_{min}$=minimum coefficient of friction.

* * * * *